United States Patent [19]

Cherukuri et al.

[11] Patent Number: 5,064,658
[45] Date of Patent: Nov. 12, 1991

[54] ENCAPSULATED SYNERGISTIC SWEETENING AGENT COMPOSITIONS COMPRISING ASPARTAME AND ACESULFAME-K AND METHODS FOR PREPARING SAME

[75] Inventors: Subraman R. Cherukuri, Towaco; Steven M. Faust, Stanhope, both of N.J.

[73] Assignee: Warner-Lamber Company, Morris Plains, N.J.

[21] Appl. No.: 606,230

[22] Filed: Oct. 31, 1990

[51] Int. Cl.$^5$ .............................................. A23G 3/30
[52] U.S. Cl. ......................................... 426/3; 426/96; 426/804; 426/548; 426/658
[58] Field of Search .................. 426/3.6, 548, 96, 658, 426/804

[56] References Cited

U.S. PATENT DOCUMENTS 4,384,004  5/1983  Cea et al. ................................. 426/3
4,711,784 12/1987  Yang ...................................... 426/96

OTHER PUBLICATIONS

Frank et al., "An Assessment of Binary Mixture Interaction For Nine Sweeteners", Chemical Senses, vol. 14, pp. 621–632 1989.

Gelardi, R. C. "The Multiple Sweetener Approach and New Sweeteners on the Horizon", Food Tech. Jan. pp. 123–124 1987.

Primary Examiner—Jeanette Hunter
Attorney, Agent, or Firm—Craig M. Bell

[57] ABSTRACT

This invention pertains to sweetened chewing gum compositions which comprise (A) a gum base; (B) a bulking agent; (C) a flavoring agent; and (D) an encapsulated synergistic sweetening agent composition which comprises (a) a synergistic combination of N-L-alpha-aspartyl-L-phenylalanine 1-methyl ester and the potassium salt of 6-methyl-1,2,3-oxathiazin-4(3H)-one-2,2-dioxide, wherein the synergistic combination is present in an amount from about 0.01% to about 50%, by weight of the encapsulated sweetening agent composition; (b) an emulsifier present in amount from about 0.5% to about 20%, by weight of the encapsulated sweetening agent composition, and selected from the group consisting of lecithin, ester of stearates, esters of palmitates, esters of oleates, esters of glycerides, sucrose polyesters, polyglycerol esters, and mixtures thereof; and (c) polyvinyl acetate, having a molecular weight from about 2,000 to about 14,000, present in an amount from about 40% to about 93%, by weight of the encapsulated sweetening agent composition; wherein N-L-alpha-aspartyl-L-phenylalanine 1-methyl ester is present in an amount from about 0.065% to about 0.095%, by weight of the chewing gum composition. This invention also pertains to methods for preparing the encapsulated synergistic sweetening agent compositions and the chewing gum compositions in which they may be employed.

20 Claims, 7 Drawing Sheets

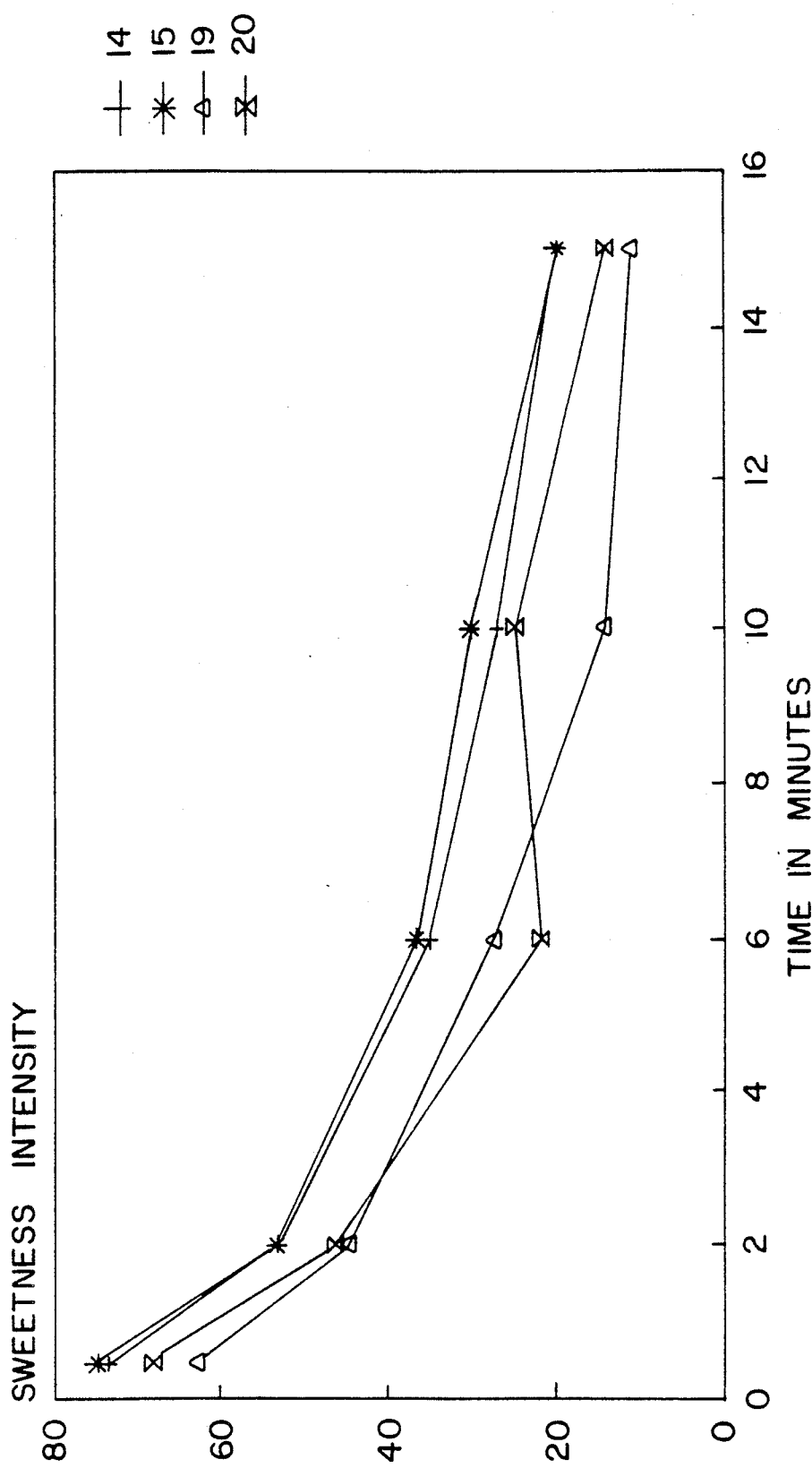

ENCAPSULATED SYNERGISTIC SWEETENING AGENT COMPOSITIONS COMPRISING ASPARTAME AND ACESULFAME-K AND METHODS FOR PREPARING SAME

BACKGROUND OF THE INVENTION

1. Field of the Invention

This invention pertains to chewing gum compositions containing encapsulated multiple intense sweetening agents in synergistic ratios having an enhanced sweetening effect. More particularly, this invention relates to sweetened chewing gum compositions containing an encapsulated synergistic sweetening agent composition which comprises a synergistic combination of N-L-alpha-aspartyl-L-phenylalanine 1-methyl ester (Aspartame) and the potassium salt of 6-methyl-1,2,3-oxathiazin-4(3H)-one-2,2-dioxide (Acesulfame-K). This invention also relates to methods for preparing these encapsulated synergistic sweetening compositions and the chewing gum compositions in which they may be employed.

2. Description of the Prior Art

Intense sweetening agents are well known in the art and are widely used as substitutes for sugar in many low calorie and noncariogenic compositions. Intense sweetening agents are natural or synthetic compounds which have a greater sweetening intensity, and usually a lower caloric value, than that of sugar (sucrose). Because intense sweetening agents have greater sweetening properties than sugar, smaller amounts of the sweetening agents provide sweetening intensity equivalent to larger amounts of sugar.

Intense sweeteners have a wide range of chemically distinct structures and hence possess varying properties. These intense sweetener compounds include water-soluble artificial sweeteners such as 2-benzisothiazol-3(2H)-one 1, 1-dioxide (saccharin and its salts), cyclohexylsulfamic acid (cyclamate and its salts), and the potassium salt of 6-methyl-1,2,3-oxathiazin-4(3H)-one-2,2-dioxide (Acesulfame-K, a commercially available product from Hoechst Celanese Corporation, Somerville, N.J.), proteins such as thaumatin (Talin, a commercially available product of Tate & Lyle Products, Reading, United Kingdom), commercially available product of McNeil Specialty Products Company, Skillman, N.J.), and dipeptides such as N-L-alpha-aspartyl-L-phenylalanine 1-methyl ester (Aspartame, a commercially available product of the Nutrasweet Company, Deerfield, Ill.) and L-alpha-aspartyl-D-alanine N-(2,2,4-tetramethyl-3-thietanyl)amide (Alitame, a commercially available product of Pfizer, New York, N.Y.), and dihydrochalcones. Each of these sweetening agents has a distinct sweetening intensity compared to sucrose and this sweetening intensity is well documented. For example, the following sweetening agents have the sweetening intensities set out below.

SWEETNESS INTENSITIES OF VARIOUS SWEETENING AGENTS

| COMPOUND | SWEETNESS INTENSITY* |
|---|---|
| 1, 2-Benzisothiazol-3(2H)-one 1, 1-dioxide (Saccharin and its salts) | 300 X |
| Cyclohexylsulfamic acid (Cyclamate and its salts) | 30 X |
| N-L-alpha-Aspartyl-L-phenylalanine 1-methyl ester (Aspartame) | 180 X |
| Potassium salt of 6-methyl-1,2,3-oxathiazin-4(3H)-one-2,2-dioxide (Acesulfame-K) | 160 X 200 X |
| 4,1',6'-Trichloro-4,1',6'-trideoxy-galactosucrose (Sucralose) | 600 X |
| L-alpha-Aspartyl-N-(2,2,4,4-tetramethyl-3-thietanyl)-D-alaninamide hydrate (Alitame) | 2000 X |

*Compared to sucrose.

Because each intense sweetening agent is chemically distinct, each sweetening agent presents a different challenge with respect to the actual use of such sweetening agent in ingestible compositions. For example, some intense sweetening agents present stability problems, such as Aspartame, which exhibits instability in the presence of aldehydes, ketones, moisture, and the like. Other intense sweetening agents have an associated bitter taste or off-note such as Saccharin (a commercially available product of PMC Specialty Group Inc., Cincinnati, Ohio), stevioside, Acesulfame-K, glycyrrhizin, dipotassium glycyrrhizin, glycyrrhizic acid ammonium salt, and thaumatin (Talin). Many sweetening agent combinations are known which help to overcome these stability and taste problems and which possess synergistic sweetening properties.

U.S. Pat. No. 4,535,396, issued to Stephens, Jr. et al. and assigned to Pfizer Inc., teaches a method of masking the bitter taste and enhancing the sweet taste of Acesulfame-K by combining it with the sweetening agent Alitame.

U.S. Pat. No. 4,495,170, issued to Beyts et al. and assigned to Tate and Lyle plc, disclosed synergistic sweetening compositions which comprise a mixture of a chlorodeoxysugar and another sweetening agent which has an associated bitter taste. The chlorodeoxysugars are selected from the group consisting of chlorodeoxysucroses and chlorodeoxygalactosucroses. The bitter tasting sweetening agent is selected from the group consisting of Saccharin, stevioside and Acesulfame-K. The combination provides a greater sweetening intensity than would be expected by the mere combination of the two intense sweetening agents.

U.S. Pat. No. 4,158,068, issued to Von Rymon Lioinski et al. and assigned to Hoechst (West Germany), discloses a sweetening agent mixture to improve the saccharose-like quality of acetosulfame-K. Specifically, acetosulfame-K is combined with at least one intense sweetening agent selected from the group consisting of aspartyl peptide ester sweetening agents, sulfamate sweetening agents, sulfimide sweetening agents and dihydrochalcone sweetening agents.

U.S. Pat. No. 3,943,258, issued to Bahoshy et al. and assigned to General Foods Corporation, discloses a chewing gum comprising a bulk sweetening agent and at least 0.3% L-aspartyl-L-phenylalanine methyl ester, by weight of the gum composition, to provide longer lasting sweetness and flavor.

U.S. Pat. No. 3,982,023, issued to Bahoshy et al. and assigned to General Foods Corporation, discloses a chewing gum comprising a bulk sweetening agent and a non-dipeptide intense sweetening agent, in an amount sufficient to impart normally accepted sweetness to the gum, and at least 0.1% L-aspartyl-L-phenylalanine methyl ester, by weight of the gum composition, to provide longer lasting sweetness and flavor.

U.S. Pat. No. 4,816,265, issued to Cherukuri et al., and assigned to Warner-Lambert Company, discloses a chewing gum composition having prolonged sweetness duration which contains an encapsulated synergistic sweetening agent composition which comprises a sweetening agent present in an amount from about 0.01% to about 50%, an emulsifier present in an amount from about 0.5% to about 20%, and polyvinyl acetate present in an amount from about 40% to about 93%, by weight of the encapsulated sweetening agent composition.

Thus, many combinations of intense sweetening agents are known which have specific sweetness intensities compared to sucrose. There is still a need, however, for sweetening compositions which have enhanced sweetening intensities for use in ingestible compositions. Such enhanced or synergistic sweetening compositions would permit an ingestible composition to contain a reduced total amount of sweetening composition, and would thereby reduce costs, stability problems, taste problems, and the like. The present invention provides such synergistic sweetening compositions having enhanced sweetness intensity and the chewing gum compositions in which they may be employed.

SUMMARY OF THE INVENTION

This invention pertains to sweetened chewing gum compositions which comprise (A) a gum base; (B) a bulking agent; (C) a flavoring agent; and (D) an encapsulated synergistic sweetening agent composition which comprises (a) a synergistic combination of N-L-alpha-aspartyl-L-phenylalanine 1-methyl ester and the potassium salt of 6-methyl-1,2,3-oxathiazin-4(3H)-one-2,2-dioxide, wherein the synergistic combination is present in an amount from about 0.01% to about 50%, by weight of the encapsulated sweetening agent composition; (b) an emulsifier present in an amount from about 0.5% to about 20%, by weight of the encapsulated sweetening agent composition, and selected from the group consisting of lecithin, esters of stearates, esters of palmitates, esters of oleates, esters of glycerides, sucrose polyesters, polyglycerol esters, and mixtures thereof; and (c) polyvinyl acetate, having a molecular weight from about 2,000 to about 14,000, present in an amount from about 40% to about 93%, by weight of the encapsulated sweetening agent composition; wherein N-L-alpha-aspartyl-L-phenylalanine 1-methyl ester is present in an amount from about 0.065% to about 0.095%, by weight of the chewing gum composition. This invention also pertains to methods for preparing the encapsulated synergistic sweetening agent compositions and the chewing gum compositions in which they may be employed.

BRIEF DESCRIPTION OF THE FIGURES

FIG. 7 depicts in graphic format the sweetness intensity versus time of chewing gum compositions comprising Aspartame and Acesulfame-K in various forms and ratios (Examples 14, 15, 19, and 20).

DETAILED DESCRIPTION OF THE INVENTION

Figure 1:
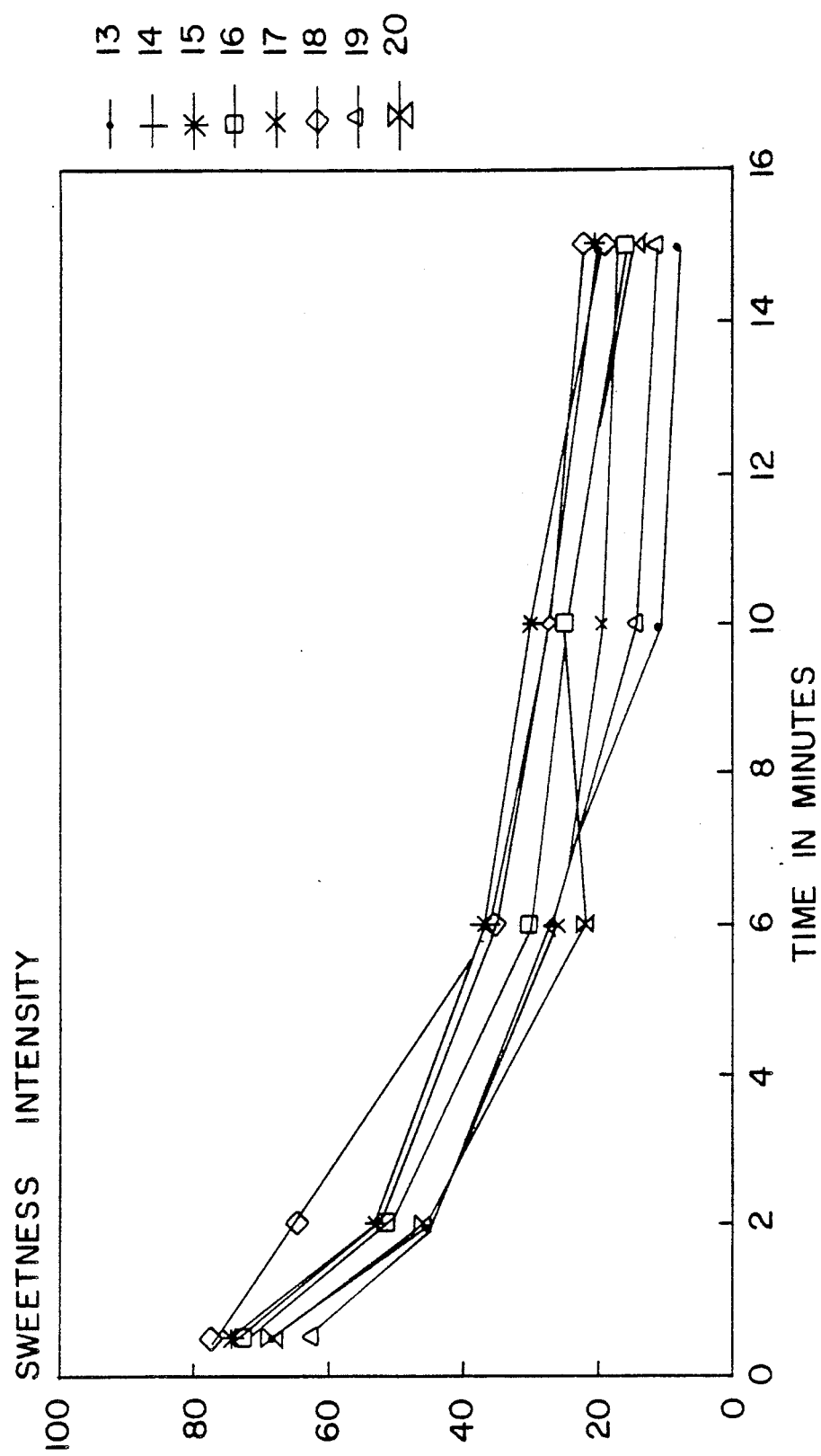
FIG. 1 depicts in graphic format the sweetness intensity versus time of chewing gum compositions comprising Aspartame and Acesulfame-K in various forms and ratios (Examples 13-20).

Applicants have discovered that by incorporating an encapsulated synergistic combination of Aspartame and Acesulfame-K into a chewing gum composition, chewing gums having enhanced initial sweetness and longer lasting sweetness can be obtained. As a result, lower amounts of the synergistic combination of Aspartame and Acesulfame-K may be used in a chewing gum composition when the synergistic combination is encapsulated. Applicants believe that while Aspartame and Acesulfame-K may have similar solubilities in many edible compositions, the intense sweeteners have different solubilities in chewing gum compositions which causes the sweetening agents to be released from the gum at different rates. Because of the different release rates, the synergistic sweetening effect and the bitterness masking effect of the combination of sweetening agents in gum compositions is diminished. The conventional method to overcome this differential solubility and release rate effect is to increase the amount of intense sweetening agents in the chewing gum composition. Applicants have discovered that by encapsulating a core of Aspartame and Acesulfame-K with a coating layer of polyvinyl acetate, the solubilities and release rates of the synergistic combination of Aspartame and Acesulfame-K in a chewing gum composition will be the same. The simultaneous presentation of the synergistic combination of sweetening agents optimizes the synergistic sweetening effect and the bitterness masking effect of the sweetening agents in gum. Because of this optimization of effects, applicants' encapsulated synergistic sweetening agent compositions have the advantage of requiring lower amounts of the sweetening agents to achieve an intense and prolonged sweetening effect in a chewing gum composition.

Applicants define the terms "ingestible" and "edible" to include all materials and compositions which are used by or which perform a function in the body. Materials and compositions which are adsorbed and those which are not absorbed as well as those which are digestible and non-digestible are included.

The encapsulated synergistic sweetening agent compositions of the present invention comprise a core containing the intense sweetening agents Aspartame and Acesulfame-K and a coating layer comprising low molecular weight polyvinyl acetate and an emulsifier.

Aspartame is an intense sweetening agent (sweetener) which has a clean sugar-like sweetness with essentially no bitter after-taste, but is unstable in water. Aspartame is also known as N-L-alpha-aspartyl-L-phenylalanine 1-methyl ester and has the chemical structure shown below:

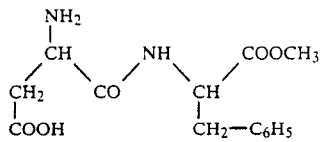

Acesulfame-K is an intense sweetening agent which is soluble and stable in water, but has an aftertaste. Acesulfame-K is also known as the potassium salt of 6-methyl-1,2,3-oxathiazin-4(3H)-one-2,2-dioxide and has the chemical structure shown below:

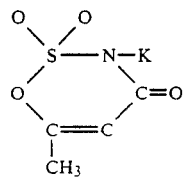

N-L-alpha-Aspartyl-L-phenylalanine 1-methyl ester and the potassium salt of 6-methyl-1,2,3-oxathiazin-4(3H)-one-2,2-dioxide are present in the core of the encapsulated synergistic sweetening agent composition in a synergistic combination. In a preferred embodiment, the synergistic combination of N-L-alpha-aspartyl-L-phenylalanine 1-methyl ester and the potassium salt of 6-methyl-1,2,3-oxathiazin-4(3H)-one-2,2-dioxide is present in a ratio by weight of about 40:60 or about 20:80, respectively, and more preferably in a ratio by weight of about 40:60, respectively.

The core of the encapsulated synergistic sweetening agent composition of the present invention is prepared by admixing N-L-alpha-aspartyl-L-phenylalanine 1-methyl ester and the potassium salt of 6-methyl-1,2,3-oxathiazin-4(3H)-one-2,2-dioxide in synergistic combinations.

The intense sweetening agent core of the encapsulated synergistic sweetening agent composition is coated with a coating layer which comprises a combination of low molecular weight polyvinyl acetate and an emulsifier. These coating layers are substantially water-insoluble and protect the sweetening agents from hydrolytic degradation. Nevertheless, the coating layers possess sufficient hydrophilic character to swell in the presence of water and slowly release the core material.

The polyvinyl acetate in the coating layer of the present invention has a molecular weight from about 2,000 to about 14,000, and preferably from about 2,000 to about 12,000. The polyvinyl acetate is present in an amount from about 40% to about 93%, by weight of the encapsulated sweetening agent composition. In a preferred embodiment, the polyvinyl acetate is blended with a material selected from the group consisting of resins, rosins, terpenes, elastomers, waxes, and mixtures thereof.

The emulsifiers in the coating layer of the encapsulated synergistic sweetening agent composition are selected from the group consisting of lecithin, esters of stearates, esters of palmitates, esters of oleates, esters of glycerides, sucrose polyesters, polyglycerol esters, and mixtures thereof. Glyceryl monostearate is the preferred emulsifier because it inhibits the hydrolysis of polyvinyl acetate to acetic acid and polyvinyl alcohol. The emulsifier is present in an amount from about 0.5% to about 20%, by weight of the encapsulated sweetening agent composition. Preferably, the emulsifier is glyceryl monostearate present in an amount from about 2% to about 15%, by weight of the encapsulated sweetening agent composition.

The core of the encapsulated synergistic sweetening agent composition which comprises a synergistic combination of N-L-alpha-aspartyl-L-phenylalanine 1-methyl ester and the potassium salt of 6-methyl-1,2,3-oxathiazin-4(3H)-one-2,2-dioxide is present in the encapsulated sweetening agent composition in an amount from about 0.01% to about 50%, preferably in an amount from about 2% to about 10%, and more preferably in an amount from about 4% to about 6%, by weight of the The encapsulated sweetening agent compositions encapsulated sweetening agent composition.

The encapsulated sweetening agent compositions are prepared by melting the desired ratios of polyvinyl acetate and emulsifier and mixing them at a temperature of about 85° C. for a short period of time, approximately five minutes. Once these materials are sufficiently melted and homogeneously mixed, the desired amount of the synergistic combination of intense sweetening agents, in solid form, is added and blended thoroughly into the molten mass for an additional short period of mixing. The resultant mixture is a semi-solid mass, which is then cooled to room temperature to obtain a solid. The solid is then ground to a U.S. standard mesh size of about 30 to about 200 (600 to 75 microns) to yield particles in powder or granulated form.

In another embodiment, the encapsulated synergistic sweetening agent particles can be coated with an additional hydrophobic coating layer such as a fat or wax blended with an emulsifier. The waxes may be selected from the group consisting of animal waxes, vegetable waxes, synthetic waxes, petroleum waxes and mixtures thereof. Conventional fluidized bed techniques can be used for applying these additional coating layers. The particle size of the resultant sweetening agent composition is not critical and can be adjusted to accommodate a particular desired release rate and mouth feel for use in the desired chewing gum composition.

The present invention includes a chewing gum composition incorporating the inventive encapsulated synergistic sweetening agent composition and a method for preparing the improved chewing gum composition, including both chewing gum and bubble gum formulations. In general, the improved chewing gum compositions will contain a gum base, a bulking agent, an effective amount of the inventive encapsulated synergistic sweetening agent composition, and various additives such as a flavoring agent.

In accordance with this invention, an effective amount the encapsulated synergistic sweetening composition is admixed into the chewing gum composition. In a preferred embodiment, N-L-alpha-aspartyl-L-phenylalanine 1-methyl ester is present in an amount from about 0.065% to about 0.095%, by weight of the chewing gum composition. In a more preferred embodiment N-L-alpha-aspartyl-L-phenylalanine 1-methyl ester is present in an amount from about 0.07% to about 0.09%, by weight of the chewing gum composition. In a most preferred embodiment, N-L-alpha-aspartyl-L-phenylalanine 1-methyl ester is present in an amount from about 0.075% to about 0.085%, by weight of the chewing gum composition.

The chewing gum compositions may be reduced-calorie chewing gums employing high levels of a chewing gum base having an enhanced hydrophilic character. These reduced-calorie chewing gums will comprise a gum base present in an amount from about 50% to about 85%, preferably from about 50% to about 75%, and more preferably from about 60% to about 70%, by weight of the chewing gum composition. When a reduced-calorie product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking agent or a bulk sweetening agent, or both, to prepare high base-low stabilizing agent reduced-calorie gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up to about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

In one embodiment, the reduced-calorie chewing gum composition comprises a gum base present in an amount from about 40% to about 75%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base.

Chewing gum compositions employing a high level of a chewing gum base having an enhanced hydrophilic character are more fully described in U.S. Pat. No. 4,872,884, which disclosure is incorporated herein by reference.

Other gum bases having an enhanced hydrophilic nature and suitable for use in reduced-calorie chewing gum compositions in high levels may also be employed in the present invention. In general, these gum bases may be employed in amounts up to 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive encapsulated synergistic sweetening agent composition and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 85%, preferably from about 50% to about 75%, and more preferably from about 60% to about 70%, by weight of the chewing gum composition.

In another embodiment, the chewing gum composition contains lower amounts of a chewing gum base. In general, the gum base in these chewing gum compositions will be present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifiers, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the encapsulated synergistic sweetening agent composition of the present invention and conventional additives such as a bulking agent and flavoring agent to prepare a wide variety of chewing gum compositions.

In addition to the gum base, the chewing gum composition may include a bulking agent. These bulking agents (carriers, extenders) may be water-soluble and include bulking agents selected from the group consisting of, but not limited to, monosaccharides, disaccharides, polysaccharides, sugar alcohols, and mixtures thereof; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the like, and mixtures thereof. Bulking agents may be used in amounts up to 60%, and preferably in amounts from about 25% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The gum composition may include effective amounts of conventional additives selected from the group consisting of plasticizers, softeners, emulsifiers, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetener, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations of those. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture. Generally any flavoring or food additive such as those described in *Chemicals Used in Food Processing*, publication 1274, pages 63–258, by the National Academy of Sciences, may be used.

The flavoring agent may be employed in either liquid form or dried form. When employed in the dried form, suitable drying means such as spray drying the oil may be used. Alternatively, the flavoring agent may be absorbed onto water soluble materials, such as cellulose, starch, sugar, maltodextrin, and gum arabic, or may be encapsulated. The actual techniques for preparing such dried forms are well known and do not constitute a part of this invention.

The flavoring agents of the present invention may be used in many distinct physical forms well known in the art to provide an initial burst of flavor or a prolonged sensation of flavor, or both. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be used individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. An illustrative examples are the indigoid dye known as F.D.& C. Blue No.2, which is the disodium salt of 5,5-indigotindisulfonic acid, and the triphenylmethane dye known as F.D.& C. Green No. 1 which is the monosodium salt of 4-[4-(N-ethyl-p-sulfoniumbenzylamino) diphenylmethylene]-[1-(N-ethyl-N-p-sulfoniumbenzyl)-delta-2,5cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, an effective amount of the encapsulated synergistic sweetening composition is admixed into the chewing gum composition. In a preferred embodiment, N-L-alpha-aspartyl-L-phenylalanine 1-methyl ester is present in an amount from about 0.065% to about 0.095%, by weight of the chewing gum composition. In a more preferred embodiment N-L-alpha-aspartyl-L-phenylalanine 1-methyl ester is present in an amount from about 0.07% to about 0.09%, by weight of the chewing gum composition. In a most preferred embodiment, N-L-alpha-aspartyl-L-phenylalanine 1-methyl ester is present in an amount from about 0.075% to about 0.085%, by weight of the chewing gum composition. As set out above, N-L-alpha-Aspartyl-L-phenylalanine 1-methyl ester and the potassium salt of 6-methyl-1,2,3-oxathiazin-4(3H)-one-2,2-dioxide are present in the core of the encapsulated synergistic sweetening agent composition in a synergistic combination. In a preferred embodiment, the synergistic combination of N-L-alpha-aspartyl-L-phenylalanine 1-methyl ester and the potassium salt of 6-methyl-1,2,3-oxathiazin-4(3H)-one-2,2-dioxide is present in a ratio by weight of about 40:60 or about 20:80, respectively, and more preferably in a ratio by weight of about 40:60, respectively.

When the core of the intense sweetening agents is protected by the polyvinyl acetate and emulsifier coating layer, the sweetening intensity effect of the encapsulated synergistic sweetening agent composition is markedly greater than that expected by mere combination of the intense sweetening agents in a chewing gum composition. Accordingly, applicants' encapsulated synergistic sweetening agent compositions have the advantage of requiring lower amounts of sweetening agent to adequately sweeten the chewing gum composition over known compositions using the same synergistic sweetening agent combinations.

In a preferred embodiment, the present invention is directed at a sweetened chewing gum composition which comprises:
(A) a gum base;
(B) a bulking agent;
(C) a flavoring agent; and
(D) an encapsulated synergistic sweetening agent composition which comprises:
(a) a synergistic combination of N-L-alpha-aspartyl-L-phenylalanine 1-methyl ester and the potassium salt of 6-methyl-1,2,3-oxathiazin-4(3H)-one-2,2-dioxide, wherein the synergistic combination is present in an amount from about 0.01% to about 50%, by weight of the encapsulated sweetening agent composition;
(b) an emulsifier present in an amount from about 0.5% to about 20%, by weight of the encapsulated sweetening agent composition, and selected from the group consisting of lecithin, esters of stearates, esters of palmitates, esters of oleates, esters of glycerides, sucrose polyesters, polyglycerol esters, and mixtures thereof; and
(c) polyvinyl acetate, having a molecular weight from about 2,000 to about 14,000, present in an amount from about 40% to about 93%, by weight of the encapsulated sweetening agent composition;
wherein N-L-alpha-aspartyl-L-phenylalanine 1-methyl ester is present in an amount from about 0.065% to about 0.095%, by weight of the chewing gum composition.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the encapsulated synergistic sweetening agent composition and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the inventive encapsulated synergistic sweetening agent composition, plasticizer, the softener, the bulking agent, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

In a specific embodiment, the present invention is directed at a method for preparing a sweetened chewing gum composition which comprises:
(1) providing the following ingredients of the chewing gum composition:
(A) a gum base;
(B) a bulking agent;
(C) a flavoring agent; and
(D) an encapsulated synergistic sweetening agent composition which comprises:
(a) a synergistic combination of N-L-alpha-aspartyl-L-phenylalanine 1-methyl ester and the potassium salt of 6-methyl-1,2,3-oxathiazin-4(3H)-one-2,2-dioxide, wherein the synergistic combination is present in an amount from about 0.01% to about 50%, by weight of the encapsulated sweetening agent composition;
(b) an emulsifier present in an amount from about 0.5% to about 20%, by weight of the encapsulated sweetening agent composition, and selected from the group consisting of lecithin, esters of stearates, esters of palmitates, esters of oleates, esters of glycerides, sucrose polyesters, polyglycerol esters, and mixtures thereof; and
(c) polyvinyl acetate, having a molecular weight from about 2,000 to about 14,000, present in an amount from about 40% to about 93%, by weight of the encapsulated sweetening agent composition;
wherein N-L-alpha-aspartyl-L-phenylalanine 1-methyl ester is present in an amount from about 0.065% to about 0.095%, by weight of the chewing gum composition;
(2) melting and blending the polyvinyl acetate and emulsifier to form a homogeneous mixture;
(3) admixing the synergistic combination of N-L-alpha-aspartyl-L-phenylalanine 1-methyl ester and the potassium salt of 6-methyl-1,2,3-oxathiazin-4(3H)-one-2,2-dioxide into the homogeneous mixture to form a semi-solid mass;
(4) cooling the semi-solid mass to obtain a solid encapsulated sweetening agent composition and grinding the solid to a desired particle size;
(5) admixing the particles of encapsulated sweetening agent composition to a homogeneous mixture of the gum base, bulking agent, and flavoring agent; and
(6) forming the chewing gum mixture from step (5) into suitable shapes.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLES 1-12

These examples illustrate a comparison of sweetness intensity versus time for chewing gum compositions comprising Aspartame and Acesulfame-K in various forms and ratios.

The sweetening agent compositions of Examples 1-12 were prepared using various forms and ratios of Acesulfame-K and Aspartame. The three forms of intense sweetening agent used were: (1) free form, no encapsulation, up-front release; (2) an encapsulated form, a sweetener core coated with a coating layer of polyvinyl acetate and an emulsifier; and (3) a coated encapsulated form, a sweetener core coated with a coating layer of polyvinyl acetate and an emulsifier, followed by coating the encapsulated form with an additional coating layer of fat or wax. The combinations of Acesulfame-K (Ace-K) and Aspartame (APM) used in the sweetening agent compositions, as a percent by weight of the chewing gum composition, and the forms in which the sweetening agents were used [free (free), encapsulated form (capsule), and coated encapsulated form (coated capsule)] are set out in Table 1 as Examples 1-12.

TABLE 1
SWEETENING AGENT COMPOSITIONS

| Example | APM free | APM capsule | APM coated capsule | Ace-K free | Ace-K capsule | Ace-K coated capsule |
|---|---|---|---|---|---|---|
| | (Percent by Weight of the Gum Composition) | | | | | |
| 1 | | | | | 0.1964 | 0.0655 |
| 2 | | | | | 0.2619 | |
| 3 | 0.0900 | | | | 0.1719 | |
| 4 | | 0.0524 | | 0.2095 | | |
| 5 | | 0.0720 | | 0.2880 | | |
| 6 | | 0.0900 | | 0.1719 | | |
| 7 | | | 0.0900 | 0.1719 | | |
| 8 | 0.0720 | | | 0.2880 | | |
| 9 | | | 0.0720 | 0.2880 | | |
| 10 | | 0.0718* | | | 0.2867* | |
| 11 | | 0.0720* | | 0.1800 | 0.1080* | |
| 12 | | 0.0900* | | 0.0370 | 0.1350* | |

*Aspartame and Acesulfame-K were encapsulated in the same core.

The encapsulated sweetening agent compositions set out in Table 1 were prepared by melting the polyvinyl acetate (1267 g) and emulsifier (400 g) and mixing the outer layer components at a temperature of about 85° C. for approximately five minutes. The amount of the intense sweetening agents set out in Table 1 was then added and blended thoroughly into the molten mass for an additional short period of mixing. The resultant mixture was cooled to room temperature. The solid was then ground to a U.S. standard mesh size of about 60 (250 microns) to yield particles in granulated form.

The particles of sweetening agent composition of Examples 1-12 were then incorporated into a chewing gum composition suing conventional processing techniques well known in the art. The chewing gums had the composition set out in Table 2.

TABLE 2
CHEWING GUM COMPOSITIONS

| Component | % By Weight Of Total Composition |
|---|---|
| Gum Base | 11–45% |
| Bulking Agent (sorbitol/mannitol) | 30–60% |
| Humectant | 8–13% |
| Softening agent | 0.1–0.5% |
| Flavoring agent | 0.9–1.1% |
| Sweetening Agent Composition | 0.5–3% |

An expert taste panel evaluated the relative sweetening intensity of the twelve chewing gum compositions of Examples 1-12 as a function of time. The panelists assessed the chewing gum products for intensity of sweetness and flavor at 30 seconds, 2 minutes, 6 minutes, 10 minutes, and 15 minutes, using a rating scale of 0 to 100, where 0 means no sweetness and 100 means extreme sweetness. The chewing gum samples were evaluated in random order and the findings were pooled. The results of the sweetness evaluation tests are shown in Table 3.

TABLE 3
SWEETNESS INTENSITY

| Example | Time | | | | |
|---|---|---|---|---|---|
| | 30 sec | 2 min | 6 min | 10 min | 15 min |
| 1 | 75 | 60 | 10 | 0 | 0 |
| 2 | 75 | 50 | 0 | 0 | 0 |
| 3 | 70 | 65 | 10 | 0 | 0 |
| 4 | 75 | 65 | 15 | 10 | 5 |
| 5 | 80 | 75 | 20 | 15 | 5 |
| 6 | 65 | 60 | 15 | 10 | 0 |
| 7 | 55 | 65 | 25 | 20 | 15 |
| 8 | 60 | 65 | 10 | 10 | 5 |
| 9 | 60 | 70 | 25 | 15 | 25 |
| 10 | 55 | 75 | 25 | 20 | 10 |
| 11 | 70 | 80 | 20 | 10 | 0 |
| 12 | 70 | 80 | 30 | 15 | 10 |

The chewing gum of Example 1 (control), which contained free Acesulfame-K and coated Acesulfame-K, lost sweetness after 10 minutes of chewing time. The chewing gum of Example 2 (control), which contained only free Acesulfame-K, lost sweetness after six minutes of chewing time. The chewing gum of Example 3, which contained free Aspartame and free Acesulfame-K, in a ratio of 40:60, respectively, and Aspartame in an amount of 0.09%, by weight of the chewing gum composition, lost sweetness after six minutes of chewing time. The chewing gum of Example 4, which contained encapsulated Aspartame and free Acesulfame-K in a ratio of 20:80, respectively, and Aspartame in an amount of 0.052%, by weight of the chewing gum composition, retained sweetness even after 15 minutes of chewing time. The chewing gum of Example 5, which also contained encapsulated Aspartame and free Acesulfame-K, but in a ratio of 20:80, respectively, and Aspartame in an amount of 0.072%, by weight of the chewing gum composition, also retained sweetness after 15 minutes of chewing time. The chewing gum of Example 6, which contained encapsulated Aspartame and free Acesulfame-K in a ratio of 40:60, respectively, and Aspartame in an amount of 0.09%, by weight of the chewing gum composition, retained sweetness for 10 minutes of chewing time. The chewing gum of Example 7, which contained coated encapsulated Aspartame and free Acesulfame-K in a ratio of 40:60, respectively, and Aspartame in an amount of 0.09%, by weight of the chewing gum composition, retained sweetness after 15 minutes of chewing time. The chewing gum of Example 8, which contained free Aspartame and free Acesulfame-K in a ratio of 20:80, respectively, and Aspartame in an amount of 0.072%, by weight of the chewing gum composition, retained sweetness after 15 minutes of chewing time. The chewing gum of Example 9, which contained coated encapsulated Aspartame and free Acesulfame-K in a ratio of 20:80, respectively, and Aspartame in an amount of 0.072%, by weight of the chewing gum composition, retained sweetness after 15 minutes of chewing time. The chewing gum of Example 10, which contained encapsulated Aspartame and encapsulated Acesulfame-K in a ratio of 20:80, respectively, encapsulated in the same core, and Aspartame in an amount of 0.07%, by weight of the chewing gum composition, retained sweetness after 15 minutes of chewing time. The chewing gum of Example 11, which contained encapsulated Aspartame, free Acesulfame-K, and encapsulated Acesulfame-K in a ratio of 20:80, respectively, and Aspartame in an amount of 0.07%, by weight of the chewing gum composition, retained sweetness after 10 minutes of chewing time. The chewing gum of Example 12, which contained encapsulated Aspartame, free Acesulfame-K, and encapsulated Acesulfame-K in a ratio of 20:80, respectively, and Aspartame in an amount of 0.09%, by weight of the chewing gum composition, retained sweetness after 15 minutes of chewing time.

These examples show that chewing gum compositions containing encapsulated synergistic combinations of Aspartame and Acesulfame-K in the same core (Examples 10-12) had greater sweetness intensity than the compositions containing only the free Aspartame and free Acesulfame-K. The examples also show that chewing gums having satisfactory sweetness levels can be prepared using Aspartame in amounts as low as 0.07%, by weight of the chewing gum composition.

EXAMPLES 13-20

These examples illustrate a comparison of sweetness intensity versus time for chewing gum compositions comprising Aspartame and Acesulfame-K in various forms and ratios.

The sweetening agent compositions of Examples 13-20 were prepared using various forms and ratios of Acesulfame-K and Aspartame. The combinations of Acesulfame-K (Ace-K) and Aspartame (APM) used in the sweetening agent compositions, as a percent by weight of the chewing gum composition, and the forms in which the sweetening agents were used [free (free), encapsulated form (capsule), and coated encapsulated form (coated capsule)] are set out in Table 4 as Examples 13-20.

TABLE 4

| | SWEETENING AGENT COMPOSITIONS | | | | | |
|---|---|---|---|---|---|---|
| Example | APM free | APM capsule | APM coated capsule | Ace-K free | Ace-K capsule | Ace-K coated capsule |
| | (Percent by Weight of the Gum Composition) | | | | | |
| 13 | 0.095 | | | 0.1425 | | |
| 14 | 0.1782 | | 0.0594 | 0.0693 | | 0.0231 |
| 15 | | 0.095* | | | 0.1425* | |
| 16 | | 0.095 | | 0.1425 | | |
| 17 | | 0.020 | 0.075 | 0.1425 | | |
| 18 | | 0.095* | | 0.07** | 0.1425* | |
| 19 | | | | 0.1781 | | 0.0594 |
| 20 | 0.1306 | 0.0522 | 0.0522 | | | |

*Aspartame and Acesulfame-K were encapsulated in the same core.
**a spray dried blend of Acesulfame-K providing up front sweetness.

The encapsulated sweetening agent compositions of Examples 13-20 were prepared as set out above for Examples 1-12. The sweetening agent compositions of Examples 13-20 were then incorporated into a chewing gum having the composition set out above in Table 2 using conventional processing techniques.

Figure 2:
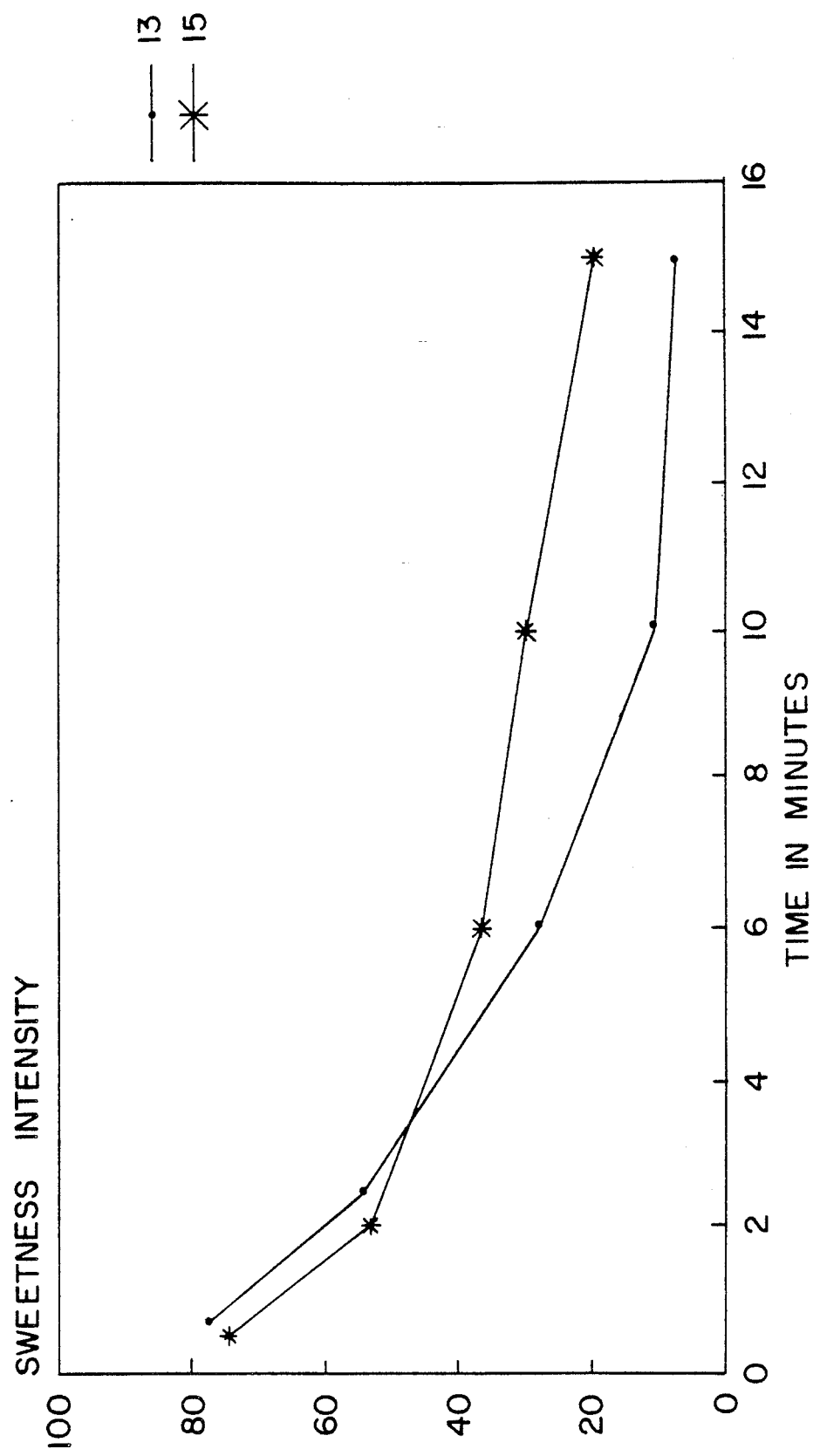
FIG. 2 depicts in graphic format the sweetness intensity versus time of chewing gum compositions comprising Aspartame and Acesulfame-K in free and encapsulated form in a ratio of 40:60, respectively (Examples 13 and 15).
Figure 3:
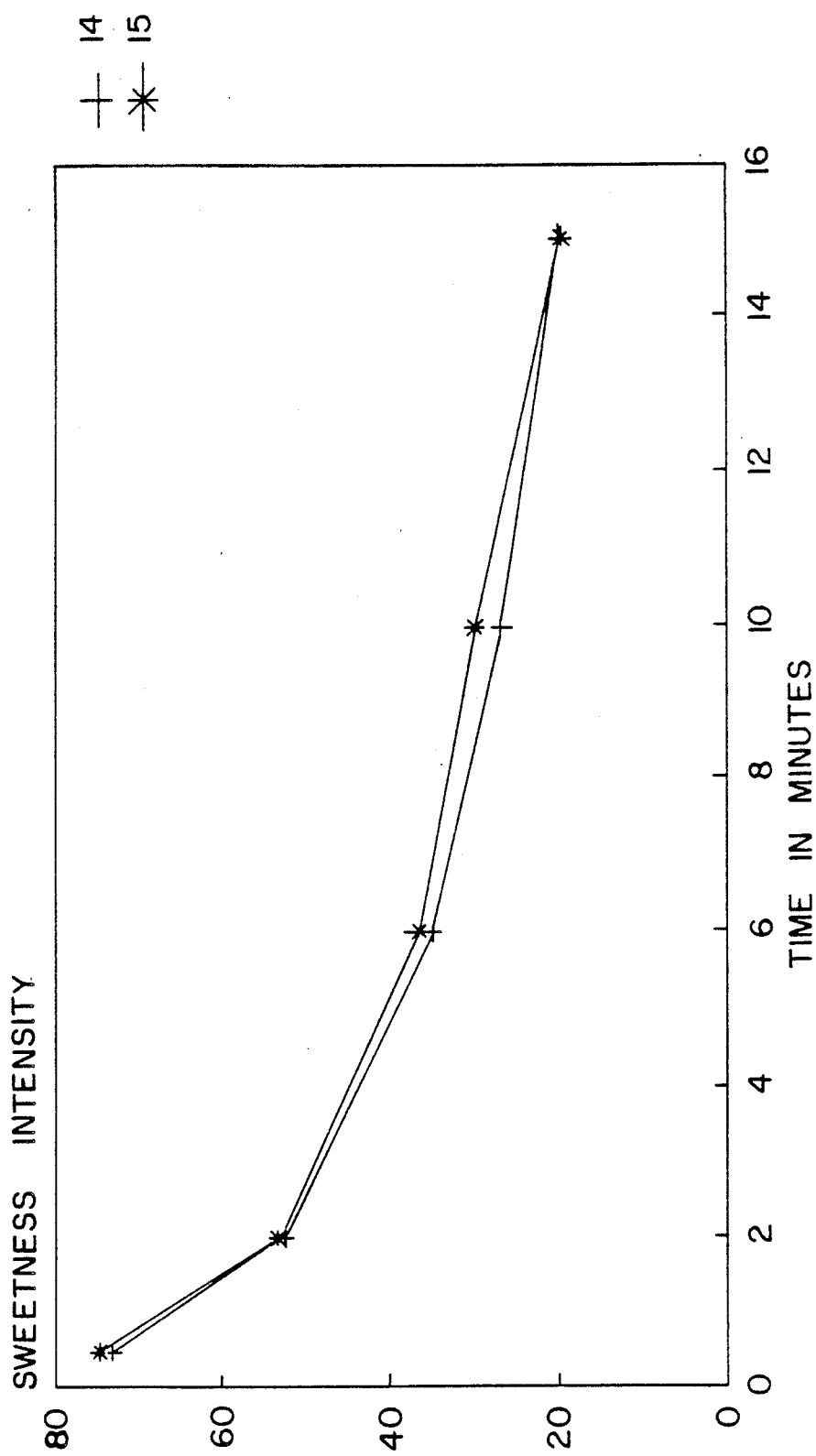
FIG. 3 depicts in graphic format the sweetness intensity versus time of chewing gum compositions comprising Aspartame and Acesulfame-K in various forms, levels, and ratios (Examples 14 and 15).
Figure 4:
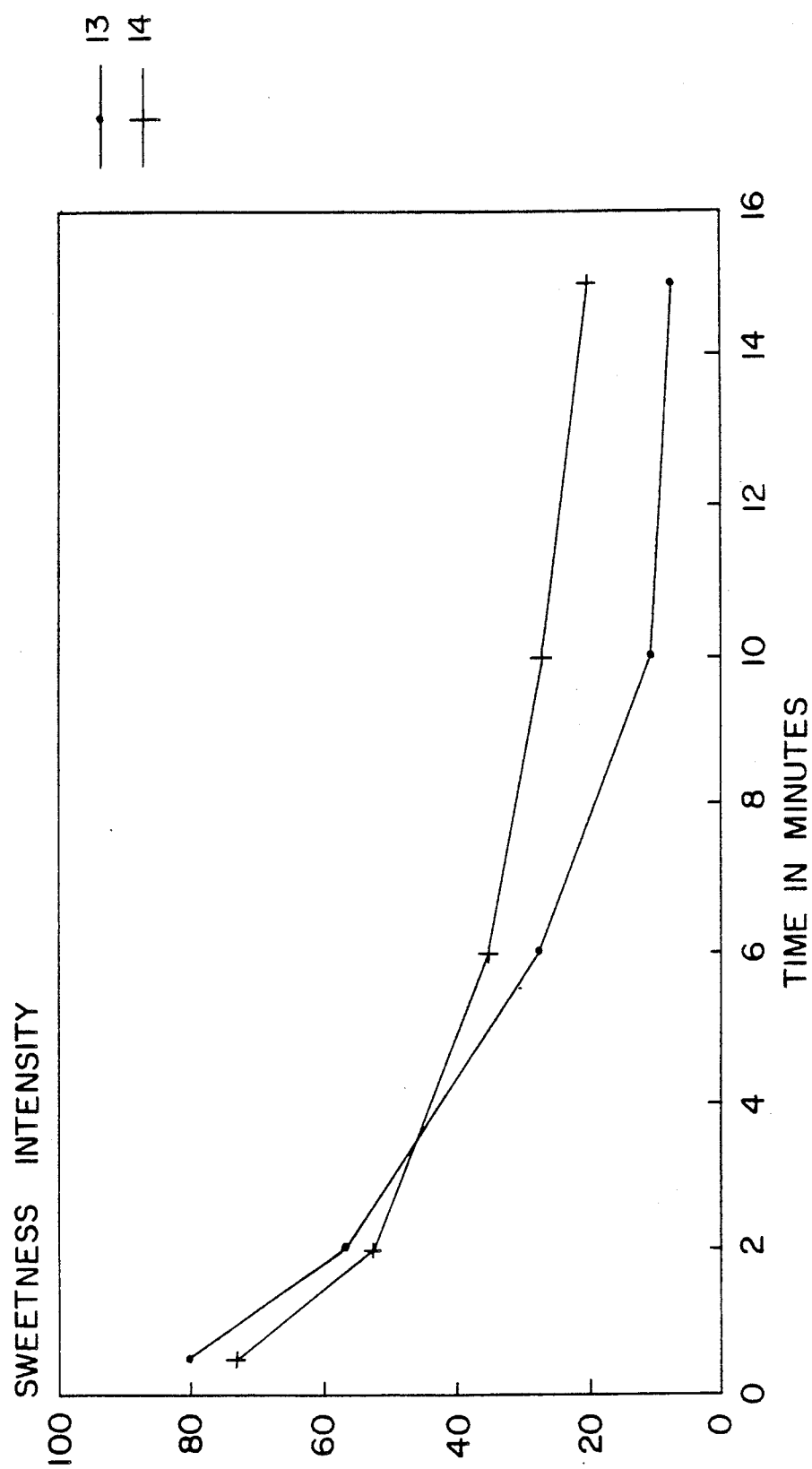
FIG. 4 depicts in graphic format the sweetness intensity versus time of chewing gum compositions comprising Aspartame and Acesulfame-K in various forms and ratios (Examples 13 and 14).
Figure 5:
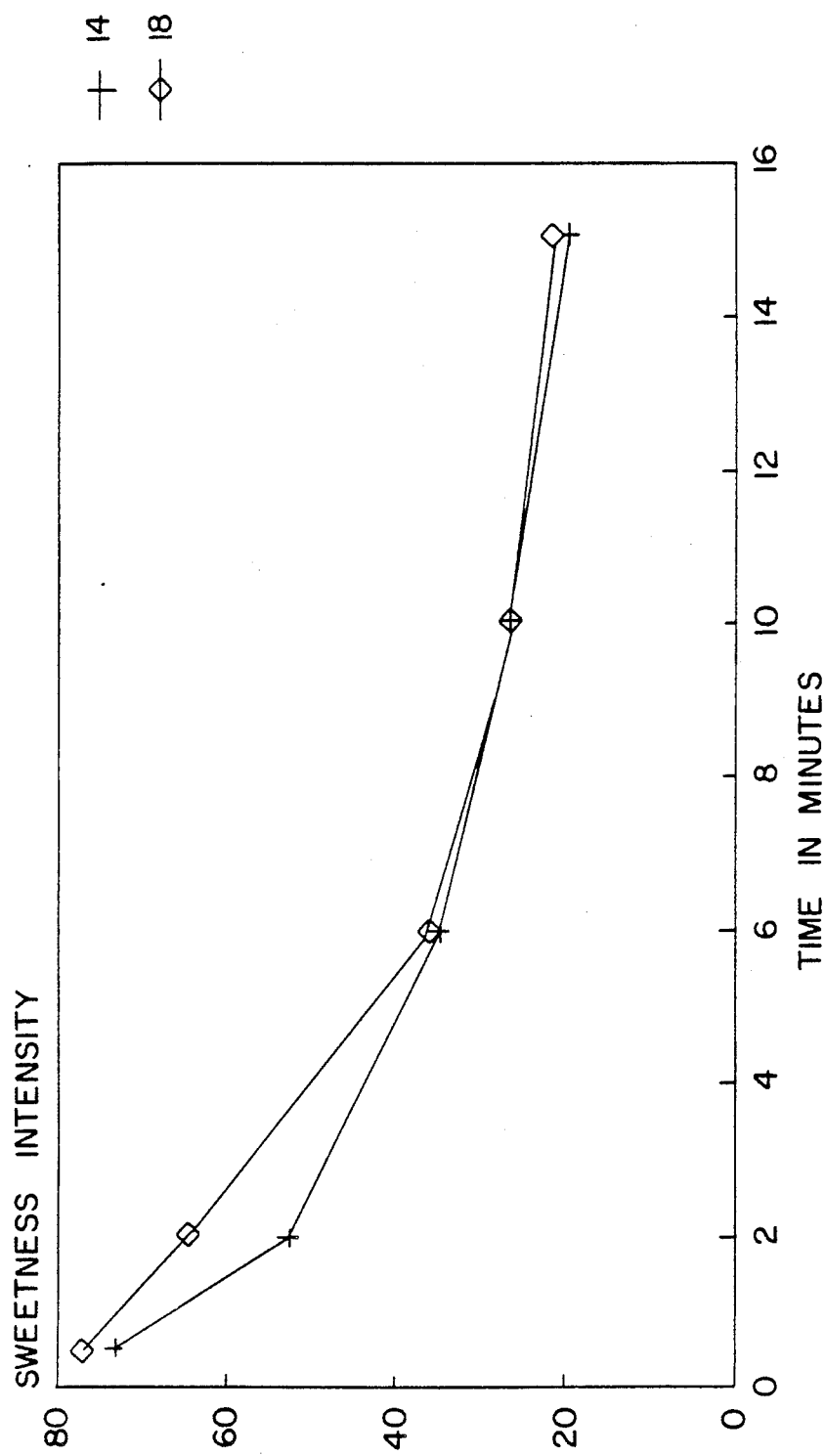
FIG. 5 depicts in graphic format the sweetness intensity versus time of chewing gum compositions comprising Aspartame and Acesulfame-K in various forms, levels, and ratios (Examples 14 and 18).
Figure 6:
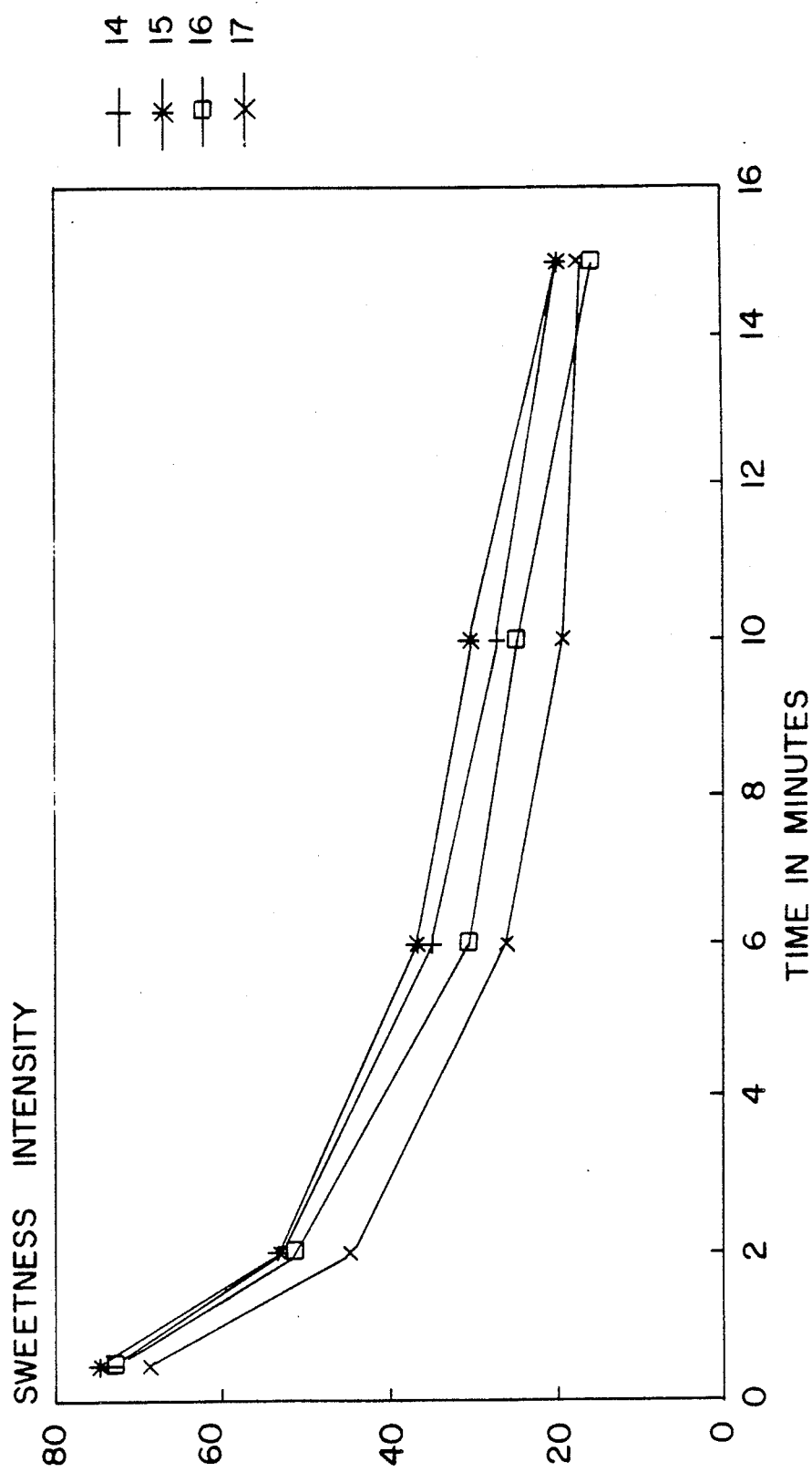
FIG. 6 depicts in graphic format the sweetness intensity versus time of chewing gum compositions comprising Aspartame and Acesulfame-K in various forms and ratios (Examples 14, 15, 16 and 17).

An expert taste panel evaluated the relative sweetening intensity of the twelve chewing gum compositions of Examples 13-20 as a function of time. The panelists assessed the chewing gum products for intensity of sweetness and flavor at 30 seconds, 2 minutes, 6 minutes, 10 minutes, and 15 minutes, using a rating scale of 0 to 100, where 0 means no sweetness and 100 means extreme sweetness. The chewing gum samples were evaluated in random order and the findings were pooled. The results of the sweetness evaluation tests are shown in FIGS. 1-7.

The chewing gum of Example 15, which contained the encapsulated multiple sweetening agent core containing Aspartame and Acesulfame-K, and the chewing gum of Example 13 (control), which contained free Aspartame and free Acesulfame-K, had similar amounts of sweetening agents, about 0.2375%. The chewing gum of Example 15 had a higher amount of sweetness released at later stages than the chewing gum of Example 13. The chewing gum of Example 15 and Example 13 showed no difference in flavor and chew texture.

The chewing gum of Example 15, which contained the encapsulated multiple sweetening agent core containing Aspartame and Acesulfame-K, also showed more sweetness release, particularly at mid-chew, than the chewing gum of Example 19 (control), which contained free Acesulfame-K and coated encapsulated Acesulfame-K, and the chewing gum composition of Example 20 (control), which contained free Aspartame, encapsulated Aspartame, and coated encapsulated Aspartame.

There was little sweetness difference between the chewing gum of Example 15, which contained the encapsulated multiple sweetening agent core containing Aspartame and Acesulfame-K, and the chewing gum of Example 14, which contained free Aspartame and coated Aspartame and free Acesulfame-K and coated Acesulfame-K, even though the chewing gum of Example 14 contained about one third more sweetening agent. The chewing gum of Example 15 did show slightly more flavor and bitterness and had a softer chew than the chewing gum of Example 14.

The chewing gum of Example 15, which contained the encapsulated multiple sweetening agent core containing Aspartame and Acesulfame-K, the chewing gum of Example 16, which contained encapsulated Aspartame and free Acesulfame-K, and the chewing gum of Example 17, which contained encapsulated Aspartame, coated encapsulated Aspartame, and free Acesulfame-K, had similar amounts of sweetening agents, about 0.2375%. The chewing gum of Example 15 showed higher perceived sweetness, at mid-level chew, than the chewing gum of Example 17. The chewing gum of Example 16, had a sweetness intensity midway between the sweetness intensities of the chewing gums of Examples 15 and 17. The chewing gums of Example 15, 16, and 17 showed no difference in flavor and little difference in texture.

The chewing gum of Example 18, which contained the encapsulated multiple sweetening agent core containing Aspartame and Acesulfame-K and free Acesulfame-K, and had 0.307% sweetening agents, showed similar levels of sweetness (except initially when the chewing gum of Example 18 was perceived to have a higher sweetness intensity) to the chewing gum of Example 14, which contained the coated encapsulated multiple sweetening agent core containing Aspartame and Acesulfame-K, free Aspartame, and free Acesulfame-K, which had a higher amount of sweetening agents, 0.33%. The chewing gum of Example 18 was perceived to be a bit more flavorful and bitter. There was essentially no difference in texture between the chewing gums of Example 18 and 14.

These examples show that the chewing gum compositions containing the encapsulated combination of Aspartame and Acesulfame-K (Example 15) had greater sweetness intensity than the compositions containing only the free Aspartame and Acesulfame-K.

The invention being thus described, it will be obvious that the same may be varied in many ways. Such variations are not to be regarded as a departure from the spirit and scope of the invention and all such modifications are intended to be included within the scope of the following claims.

We claim:

1. A sweetened chewing gum composition which comprises:
   (A) a gum base in an amount of from about 15% to about 85% by weight of the chewing gum composition;
   (B) a bulking agent in an amount of from about 25% to about 60% by weight of the chewing gum composition;
   (C) a flavoring agent in an amount of from about 0.02% to about 5.0% by weight of the chewing gum composition; and
   (D) an encapsulated synergistic sweetening agent composition which comprises:
      (a) a synergistic combination of N-L-alpha-aspartyl-L-phenylalanine 1-methyl ester and the potassium salt of 6-methyl-1,2,3-oxathiazin-4(3H)-one-2,2-dioxide, wherein the synergistic combination is present in an amount from about 0.01% to about 50%, by weight of the encapsulated sweetening agent composition;
      (b) an emulsifier present in an amount from about 0.5% to about 20%, by weight of the encapsulated sweetening agent composition, and selected from the group consisting of lecithin, esters of stearates, esters of palmitates, esters of oleates, esters of glycerides, sucrose polyesters, polyglycerol esters, and mixtures thereof; and
      (c) polyvinyl acetate, having a molecular weight from about 2,000 to about 14,000, present in an amount from about 40% to about 93%, by weight of the encapsulated sweetening agent composition;
   wherein N-L-alpha-aspartyl-L-phenylalanine 1-methyl ester is present in an amount from about 0.065% to about 0.095%, by weight of the chewing gum composition.

2. The chewing gum composition according to claim 1, wherein N-L-alpha-aspartyl-L-phenylalanine 1-methyl ester is present in an amount from about 0.07% to about 0.09%, by weight of the chewing gum composition.

3. The chewing gum composition according to claim 2, wherein N-L-alpha-aspartyl-L-phenylalanine 1-methyl ester is present in an amount from about 0.075% to about 0.085%, by weight of the chewing gum composition.

4. The chewing gum composition according to claim 1, wherein the synergistic combination of N-L-alpha-aspartyl-L-phenylalanine 1-methyl ester and the potassium salt of 6-methyl-1,2,3-oxathiazin-4(3H)-one-2,2-dioxide is present in a ratio by weight of about 40:60, respectively.

5. The chewing gum composition according to claim 1, wherein the emulsifier is glyceryl monostearate present in an amount from about 2% to about 15%, by weight of the encapsulated sweetening agent composition.

6. The chewing gum composition according to claim 1, wherein the polyvinyl acetate has a molecular weight range from about 2,000 to about 12,000.

7. The chewing gum composition according to claim 6, wherein the polyvinyl acetate is blended with a material selected from the group consisting of resins, rosins, terpenes, elastomers, waxes, and mixtures thereof.

8. The chewing gum composition according to claim 1, wherein the gum base is present in an amount up to about 55%, by weight of the chewing gum composition.

9. The chewing gum composition according to claim 1, wherein the gum base is present in an amount from about 50% to about 85%, by weight of the chewing gum composition.

10. The chewing gum composition according to claim 1, wherein the encapsulated sweetening agent composition further contains a wax material selected from the group consisting of animal waxes, vegetable waxes, synthetic waxes, petroleum wax, and mixtures thereof.

11. A method for preparing a sweetened chewing gum composition which comprises:
   (1) providing the following ingredients of the chewing gum composition:
      (A) a gum base in an amount of from about 15% to about 85% by weight of the chewing gum composition;
      (B) a bulking agent in an amount of from about 25% to about 60% by weight of the chewing gum composition;
      (C) a flavoring agent in an amount of from about 0.02% to about 5.0% by weight of the chewing gum composition; and
      (D) an encapsulated synergistic sweetening agent composition which comprises:
         (a) a synergistic combination of N-L-alpha-aspartyl-L-phenylalanine 1-methyl ester and the potassium salt of 6-methyl-1,2,3-oxathiazin-4(3H)-one-2,2-dioxide, wherein the synergistic combination is present in an amount from about 0.01% to about 50%, by weight of the encapsulated sweetening agent composition;
         (b) an emulsifier present in an amount from about 0.5% to about 20% by weight of the encapsulated sweetening agent composition, and selected from the group consisting of lecithin, esters of stearates, esters of palmitates, esters of oleates, esters of glycerides, sucrose polyesters, polyglycerol esters, and mixtures thereof; and
         (c) polyvinyl acetate, having a molecular weight from about 2,000 to about 14,000, present in an amount from about 40% to about 93%, by weight of the encapsulated sweetening agent composition;
      wherein N-L-alpha-aspartyl-L-phenylalanine 1-methyl ester is present in an amount from about 0.065% to about 0.095%, by weight of the chewing gum composition;

(2) melting and blending the polyvinyl acetate and emulsifier to form a homogeneous mixture;

(3) admixing the synergistic combination of N-L-alpha-aspartyl-L-phenylalanine 1-methyl ester and the potassium salt of 6-methyl-1,2,3-oxathiazin-4(3H)-one-2,2-dioxide into the homogeneous mixture to form a semi-solid mass;

(4) cooing the semi-solid mass to obtain a solid encapsulated sweetening agent composition and grinding the solid to a desired particle size;

(5) admixing the articles of encapsulated sweetening agent composition to a homogeneous mixture of the gum base, bulking agent, and flavoring agent; and (6) forming the chewing gum mixture from step (5) into suitable shapes.

12. The method according to claim 11, wherein N-L-alpha-aspartyl-L-phenylalanine 1-methyl ester is present in an amount from about 0.07% to about 0.09%, by weight of the chewing gum composition.

13. The method according to claim 12, wherein N-L-alpha-aspartyl-L-phenylalanine 1-methyl ester is present in an amount from about 0.075% to about 0.085%, by weight of the chewing gum composition.

14. The method according to claim 11, wherein the synergistic combination of N-L-alpha-aspartyl-L-phenylalanine 1-methyl ester and the potassium salt of 6-methyl-1,2,3-oxathiazin-4(3H)-one-2,2-dioxide is present in a ratio by weight of about 40:60, respectively.

15. The method according to claim 11, wherein the emulsifier is glyceryl monostearate present in an amount from about 2% to about 15%, by weight of the encapsulated sweetening agent composition.

16. The method according to claim 11, wherein the polyvinyl acetate has a molecular weight range from about 2,000 to about 12,000.

17. The method according to claim 16, wherein the polyvinyl acetate is blended with a material selected from the group consisting of resins, rosins, terpenes, elastomers, waxes, and mixtures thereof.

18. The method according to claim 11, wherein the gum base is present in an amount up to about 55%, by weight of the chewing gum composition.

19. The method according to claim 11, wherein the gum base is present in an amount from about 50% to about 85%, by weight of the chewing gum composition.

20. The method according to claim 11, wherein the sweetening agent composition further contains a wax material selected from the group consisting of animal waxes, vegetable waxes, synthetic waxes, petroleum was, and mixtures thereof.

* * * * *